United States Patent
Yoshino et al.

(10) Patent No.: US 12,397,852 B2
(45) Date of Patent: Aug. 26, 2025

(54) STEERING CONTROL APPARATUS

(71) Applicant: TOYOTA JIDOSHA KABUSHIKI KAISHA, Toyota (JP)

(72) Inventors: Hayato Yoshino, Miyoshi (JP); Kimiaki Ono, Okazaki (JP); Tetsuya Morino, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 18/435,200

(22) Filed: Feb. 7, 2024

(65) Prior Publication Data
US 2024/0278827 A1 Aug. 22, 2024

(30) Foreign Application Priority Data
Feb. 10, 2023 (JP) .................................. 2023-019083

(51) Int. Cl.
*B62D 6/00* (2006.01)

(52) U.S. Cl.
CPC .................................... *B62D 6/002* (2013.01)

(58) Field of Classification Search
CPC .......... B62D 6/002; B62D 6/00; B62D 7/159; B62D 5/046
See application file for complete search history.

(56) References Cited

U.S. PATENT DOCUMENTS

| | | | | |
|---|---|---|---|---|
| 4,645,025 A | * | 2/1987 | Ohe | B62D 7/1581 180/412 |
| 5,103,925 A | * | 4/1992 | Imaseki | B62D 7/159 701/41 |
| 5,816,669 A | * | 10/1998 | Hiwatashi | B62D 7/159 303/146 |
| 9,783,229 B2 | * | 10/2017 | Mukai | B62D 6/00 |
| 2015/0151750 A1 | * | 6/2015 | Tsuchiya | B60W 10/20 701/41 |
| 2017/0334482 A1 | * | 11/2017 | Kojima | G01B 21/22 |
| 2018/0194394 A1 | | 7/2018 | Stratmann et al. | |
| 2022/0332366 A1 | * | 10/2022 | Sonoda | B62D 7/159 |

FOREIGN PATENT DOCUMENTS

JP 6706634 B2 6/2020

* cited by examiner

*Primary Examiner* — George C Jin
(74) *Attorney, Agent, or Firm* — Sughrue Mion, PLLC

(57) ABSTRACT

A steering control apparatus comprises an environment sensor for detecting a condition around a vehicle; and a controller for controlling turning of a front wheel and turning of a rear wheel, wherein the controller is configured to: calculate a total steering angle which is a steering angle required for causing the vehicle to travel along a target path, based on at least a detection result of the environment sensor; turn the front wheel based on a front wheel target steering angle; and turn the rear wheel based on a rear wheel target steering angle that is a subtraction value obtained by subtracting the front wheel target steering angle from the total steering angle.

5 Claims, 5 Drawing Sheets

STEERING CONTROL APPARATUS

CROSS REFERENCE TO RELATED APPLICATION

This application claims priority to Japanese Patent Application No. 2023-19083 filed on Feb. 10, 2023, which is incorporated herein by reference in its entirety including the specification, claims, drawings, and abstract.

TECHNICAL FIELD

This specification discloses a steering control apparatus for controlling steering of a vehicle.

BACKGROUND

There has been known a technology for automatically steering a rear wheel in order to improve traveling performance of a vehicle. For example, Patent Document 1 discloses a technology in which a rear wheel is automatically steered in order to compensate for a self-aligning torque generated in a front wheel, whereby the front wheel can maintain its original steering angle.

However, many of such prior arts are based on the assumption that the driver steers the front wheel. Therefore, the technology of Patent Document 1 cannot be applied to an automatic steering technology in which the vehicle automatically performs all steering of the vehicle.

In other words, recently, there has been known an automatic steering technology in which a vehicle automatically performs all steering of a vehicle. For example, in the lane keep assist function, the vehicle automatically controls a steering angle of a wheel so that the vehicle runs along a lane. In order to improve the traveling performance of a vehicle, it is also required to appropriately steer a rear wheel in such an automatic steering technology. However, in the conventional automatic steering technology, steering of the rear wheel is not sufficiently studied. As a result, in the conventional automatic steering technology, the traveling performance of the vehicle cannot be sufficiently improved, or there is a possibility that the driver feels uncomfortable with respect to steering.

Accordingly, this specification discloses a steering control apparatus capable of further improving the traveling performance of a vehicle while reducing the feeling of discomfort of an occupant during automatic steering.

CITATION LIST

PATENT DOCUMENT 1: JP. 6706634 B

SUMMARY

A steering control apparatus disclosed herein comprises an environment sensor for detecting a condition around a vehicle; and a controller for controlling turning of a front wheel and turning of a rear wheel, wherein the controller is configured to: calculate a total steering angle which is a steering angle required for causing the vehicle to travel along a target path, based on at least a detection result of the environment sensor; turn the front wheel based on a front wheel target steering angle; and turn the rear wheel based on a rear wheel target steering angle that is a subtraction value obtained by subtracting the front wheel target steering angle from the total steering angle.

With such a configuration, since the steering angle of the vehicle is distributed to the front wheel and the rear wheel as in the case of the manual steering, it is possible to improve the traveling performance of the vehicle while reducing the feeling of discomfort of the occupant.

The controller may be configured to: calculate the target path and a current actual path based on the detection result of the environment sensor; calculate an FF steering angle based on the target path; calculate an FB steering angle based on a difference between the target path and the actual path; and calculate a sum of the FF steering angle and the FB steering angle as the total steering angle, the front wheel target steering angle is the FF steering angle, and the rear wheel target steering angle is the FB steering angle.

With such a configuration, the feeling of discomfort of the occupant can be reduced with a simple configuration.

The controller may be configured to: calculate the target path and a current actual path based on the detection result of the environment sensor; calculate an FF steering angle based on the target path; calculate an FB steering angle based on a difference between the target path and the actual path; and calculate a sum of the FF steering angle and the FB steering angle as the total steering angle, the rear wheel target steering angle is a value obtained by multiplying the FB steering angle by a distribution coefficient of greater than 0 and less than 1, a value obtained by multiplying the total steering angle by the distribution coefficient, or a value obtained by adding a portion of the FF steering angle to a value obtained by multiplying the FB steering angle by the distribution coefficient, and the front wheel target steering angle is a subtraction value obtained by subtracting the rear wheel target steering angle from the total steering angle.

With such a configuration, a steering feeling similar to that of the manual steering can be given to the occupant. As a result, the uncomfortable feeling of the occupant can be further reduced.

The distribution coefficient may be a variable value that decreases as at least one of a lateral acceleration, a vehicle speed, and a curvature of the target path increases.

With this configuration, even when the lateral acceleration is large, the same steering feeling as that of the manual steering can be given to the occupant. As a result, the uncomfortable feeling of the occupant can be further reduced.

The controller may be configured to: calculate a front wheel FB torque based on a difference between the front wheel target steering angle and a detected steering angle of the front wheel; calculate a front wheel FF torque for compensating for a self-aligning torque of the front wheel and a self-aligning torque of the rear wheel based on the total steering angle; and calculate a front wheel torque command for turning the front wheel based on a sum of the front wheel FF torque and the front wheel FB torque.

With this configuration, the front wheel can be more appropriately steered.

According to the steering control apparatus disclosed in this specification, since the total steering angle is distributed to the front wheel and the rear wheel to turn the steering wheel, it is possible to improve the traveling performance of the vehicle during automatic steering while reducing the feeling of discomfort of the occupant.

BRIEF DESCRIPTION OF DRAWINGS

Embodiment(s) of the present disclosure will be described based on the following figures, wherein.

DESCRIPTION OF EMBODIMENT

Figure 1:
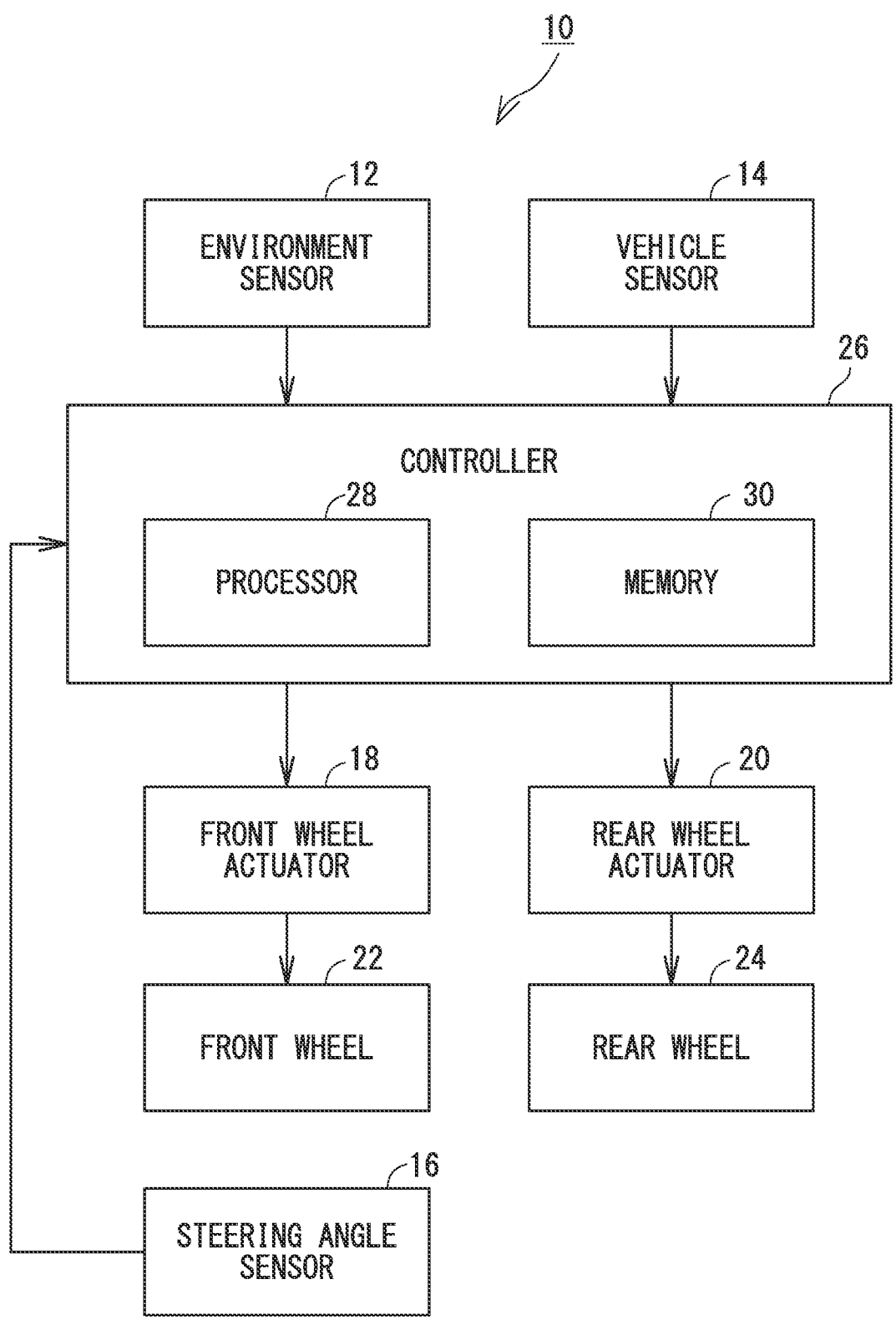
FIG. 1 is a block diagram showing a configuration of a steering control apparatus.

Hereinafter, the configuration of the steering control apparatus 10 will be described with reference to the drawings. FIG. 1 is a block diagram showing a configuration of a steering control apparatus 10. The steering control apparatus 10 is applied to an automatic driving vehicle in which the vehicle automatically controls steering and acceleration/deceleration, or an advanced driving assist vehicle in which at least the vehicle temporarily controls steering. Advanced driving assistance includes lane keep assist that automatically travels the vehicle along a lane.

The steering control apparatus 10 includes a plurality of sensors 12, 14, and 16, actuators 18 and 20 for driving wheels, and a controller 26 for controlling the actuators 18 and 20. The environment sensor 12 detects a state around the vehicle. More specifically, the environment sensor 12 detects at least a lane and a surrounding obstacle (e.g., another vehicle or a walker). The environment sensor 12 includes, for example, at least one of a camera, a LiDAR, a millimeter wave radar, and an ultrasonic sensor.

The vehicle sensor 14 detects a state of the vehicle. More specifically, the vehicle sensor 14 detects at least a position, a vehicle speed, an acceleration, and six-component force at the center of gravity. Note that the six-component force at the center of gravity include a longitudinal force, a lateral force, a vertical force, a roll moment, a pitch moment, and a yaw moment. The vehicle sensor 14 includes, for example, a position sensor (e.g., GPS) and an inertial sensor (e.g., a triaxial acceleration sensor, a triaxial gyroscope, a triaxial geomagnetic sensor, etc.). The steering angle sensor 16 detects a steering angle of the front wheel 22.

The front wheel actuator 18 controls a steering angle of the front wheel 22 of the vehicle in accordance with a control command from the controller 26. The front wheel actuator 18 may be provided in the steering section of the vehicle as an assist motor which is a part of the electric power steering system. Further, the front wheel actuator 18 may be provided as a steer-by-wire mechanically independent of the steering section of the vehicle.

The rear wheel actuator 20 controls a steering angle of the rear wheel 24 of the vehicle in accordance with a control command from the controller 26. The rear wheel actuator 20 may be provided in the steering section of the vehicle as an assist motor, or may be provided mechanically independent of the steering section of the vehicle as a steer-by-wire.

The controller 26 outputs a control command for controlling steering of the front wheel 22 and the rear wheel 24 based on the detection results of the plurality of sensors 12, 14, and 16. The controller 26 is physically a computer having a processor 28 and a memory 30. Although the controller 26 is illustrated in FIG. 1 as a single computer, the controller 26 may comprise a plurality of physically separate computers. For example, the controller 26 may include an electric power steering ECU and a dynamic rear steering (hereinafter referred to as "DRS"). The electric power steering ECU is a computer that controls steering of the front wheel 22. The DRS is a computer that controls steering of the rear wheel 24.

Next, steering control by the steering control apparatus 10 will be described. The steering control described below is executed for automatic driving or advanced driving support for temporarily automatically controlling steering.

In the steering control, the controller 26 controls the steering angles of the front wheel 22 and the rear wheel 24 so that the vehicle passes through the center of the lane 50 on which the vehicle is currently traveling. Therefore, the center line of the lane 50 is the target path of the vehicle. The controller 26 controls the steering angle of the front wheel 22 so that the theoretical travel path of the vehicle has the same shape as the target path. Here, even if the theoretical moving path has the same shape as the target path, the actual moving path may deviate from the target path due to disturbance (for example, wind, obstacles on a road surface, or the like), intervention by a driver, or the like. Accordingly, the controller 26 compensates for the shift between the theoretical moving path and the actual path by turning the rear wheel 24.

Figure 2:
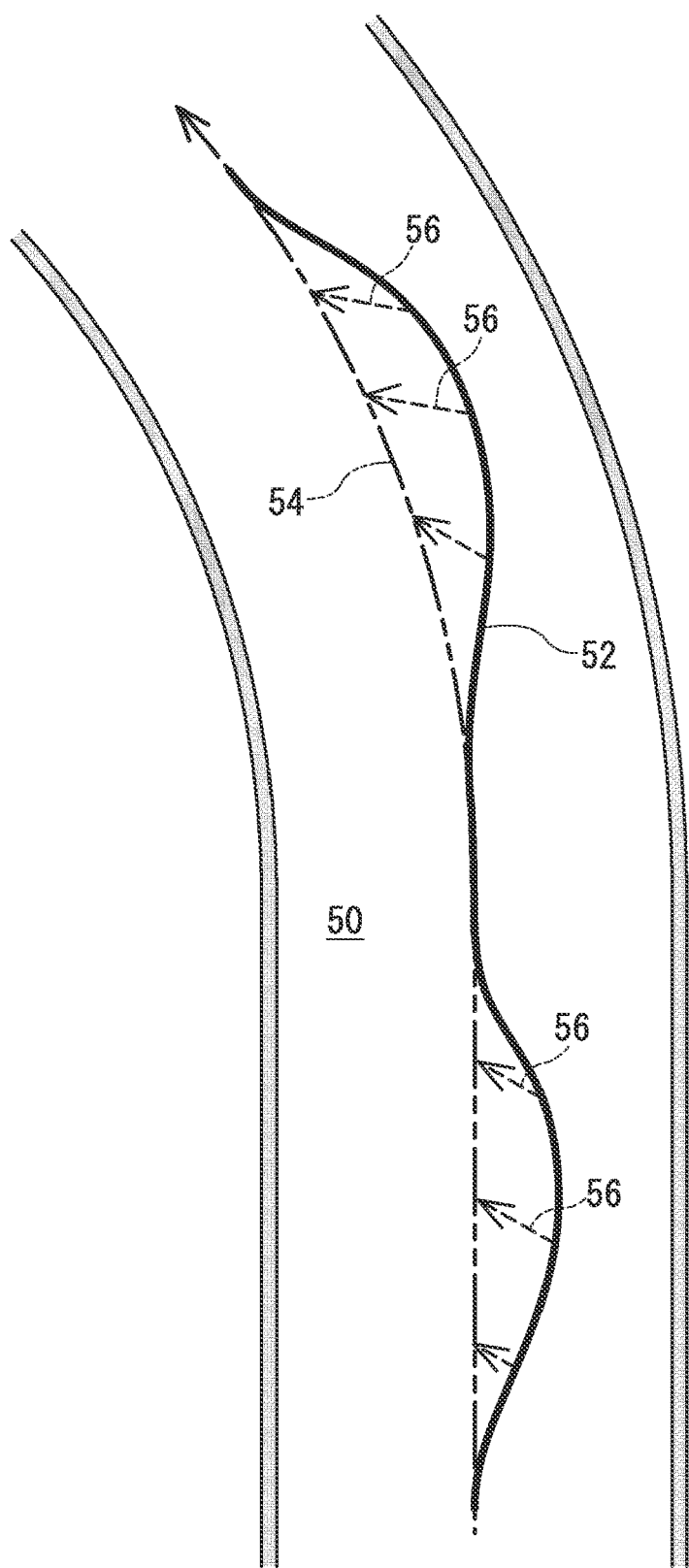
FIG. 2 is a diagram showing movement paths due to steering of front wheels and rear wheels.

FIG. 2 is a diagram showing a movement path due to steering of each of the front wheel 22 and the rear wheel 24. In FIG. 2, the solid line indicates the actual path 52 of the vehicle. The two-dot chain line indicates a theoretical movement path obtained by turning the front wheel 22. Hereinafter, this moving path is referred to as a "front wheel path 54". The broken line indicates a movement path obtained by turning the rear wheel 24. Hereinafter, this movement path is referred to as a "rear wheel path 56".

As shown in FIG. 2, when the lane 50 is linear, the front wheel path 54 is also linear. In this case, the steering angle of the front wheel 22 is "0". However, a difference may occur between the actual path 52 and the target path due to disturbance or operator intervention. At this time, the controller 26 turns the rear wheel 24 so as to resolve the difference.

When the lane 50 is curved, the front wheel path 54 is also curved. In this case, the steering angle of the front wheel 22 is an angle corresponding to the curvature of the lane 50. Also in this case, a difference may occur between the actual path 52 and the target path. Then, the controller 26 turns the rear wheel 24 so as to resolve the difference.

By turning the front wheel 22 in accordance with the target path and absorbing the difference from the target path by turning the rear wheel 24, the comfort of the occupant can be improved. For example, when the turning amount of the front wheel 22 is large during the straight traveling, the occupant tends to feel uncomfortable. According to the above-described control, since the turning amount of the front wheel 22 is reduced during the straight traveling, the uncomfortable feeling of the occupant is reduced, and the comfort of the occupant is improved. Further, even when the vehicle runs on a curve, if the turning amount of the front wheel 22 largely deviates from the curvature of the lane 50, the occupant tends to feel uncomfortable. According to the above-described control, since the turning amount of the front wheel 22 during the curve traveling is substantially the same as the turning amount in the case of the manual steering, the feeling of discomfort of the occupant is reduced. As a result, the comfort of the occupant is improved.

Figure 3:
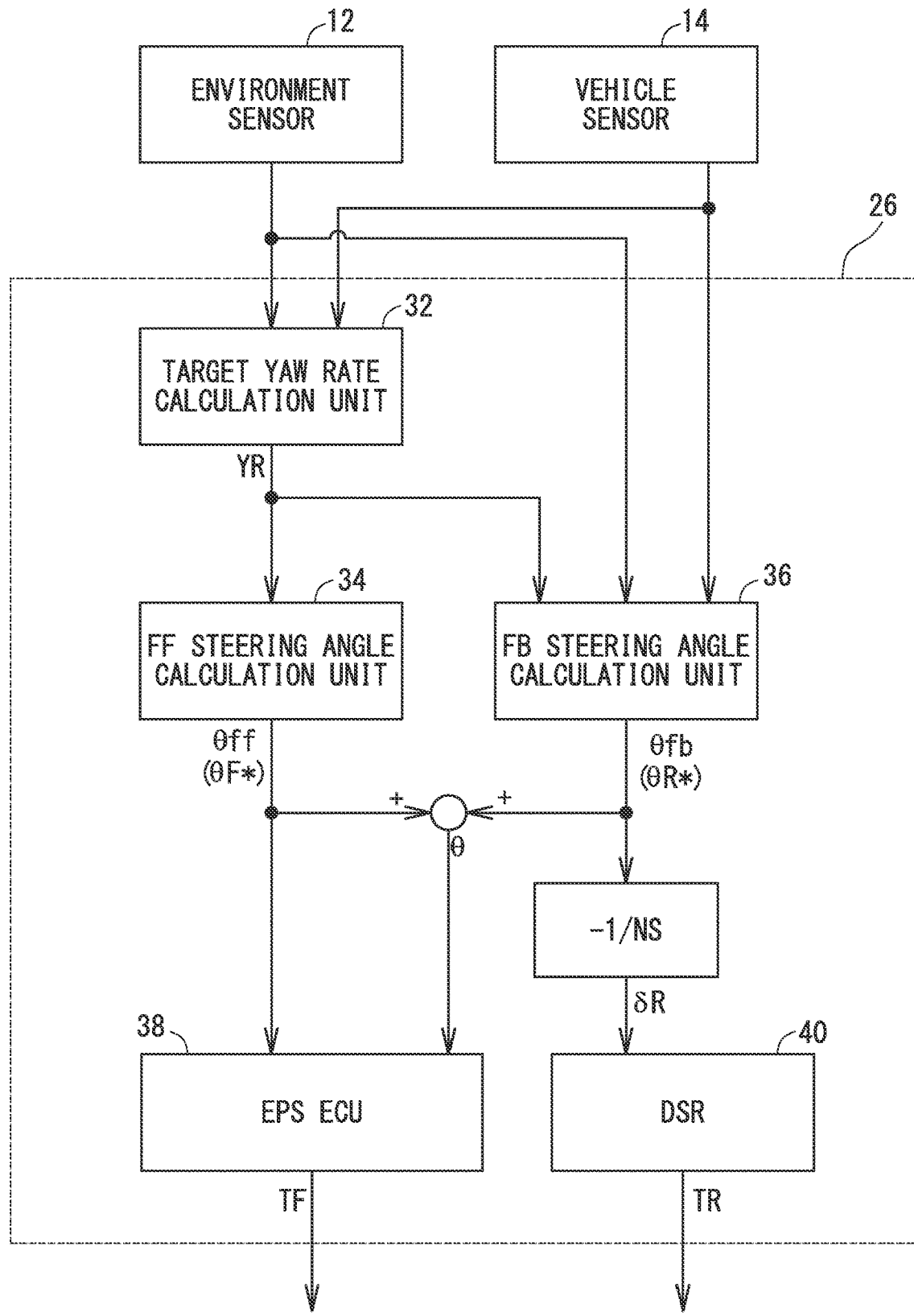
FIG. 3 is a functional block diagram of a controller.

Next, the steering control process will be described with reference to FIG. 3. FIG. 3 is a functional block diagram of the controller 26. The target yaw rate calculation unit 32 calculates a target yaw rate YR based on the detection results of the environment sensor 12 and the vehicle sensor 14. The target yaw rate YR is a parameter indicating a target path. The target yaw rate YR is calculated from the vehicle speed Vv and the curvature of the lane 50. The curvature of the lane 50 is obtained by analyzing data detected by the environment sensor 12 (e.g., an image captured by a camera).

The FF steering angle calculation unit 34 calculates a feedforward steering angle θff (hereinafter referred to as "FF steering angle θff") based on the target yaw rate YR. The FF steering angle θff is a steering angle required for moving the vehicle at the target yaw rate YR. In other words, the FF steering angle θff is a steering angle at which the theoretical travel path of the vehicle has the same shape as the target path. In this example, the FF steering angle θff is the front wheel target steering angle θF*.

The FB steering angle calculation unit 36 calculates a feedback steering angle θfb (hereinafter referred to as "FB steering angle θfb"). The FB steering angle θfb is a steering angle for eliminating the difference between the target path and the actual path 52. The FB steering angle θfb is calculated based on, for example, a lateral position, a lateral speed, a yaw angle, a yaw rate, and a steering angle. In this example, the FB steering angle θfb is the rear wheel target steering angle θR*.

The controller 26 adds the FF steering angle θff and the FB steering angle θfb to calculate the total steering angle θ. The total steering angle θ is a steering angle required for the vehicle to travel along the target path. The FF steering angle θff and the total steering angle θ are input to the electric power steering ECU 38. The electric power steering ECU 38 calculates a front wheel torque command TF for turning the front wheel 22 based on the FF steering angle θff and the total steering angle θ. The front wheel actuator 18 turns the front wheel in accordance with the front wheel torque command TF. The flow of calculation of the front wheel torque command TF will be described later.

Further, the controller 26 calculates the rear wheel break angle 8R based on the FB steering angle θfb and the steering gear ratio NS. The DRS 40 calculates the rear wheel torque command TR based on the rear wheel break angle 8R. The rear wheel actuator 20 turns the rear wheel 24 in accordance with the rear wheel torque command TR.

Figure 4:
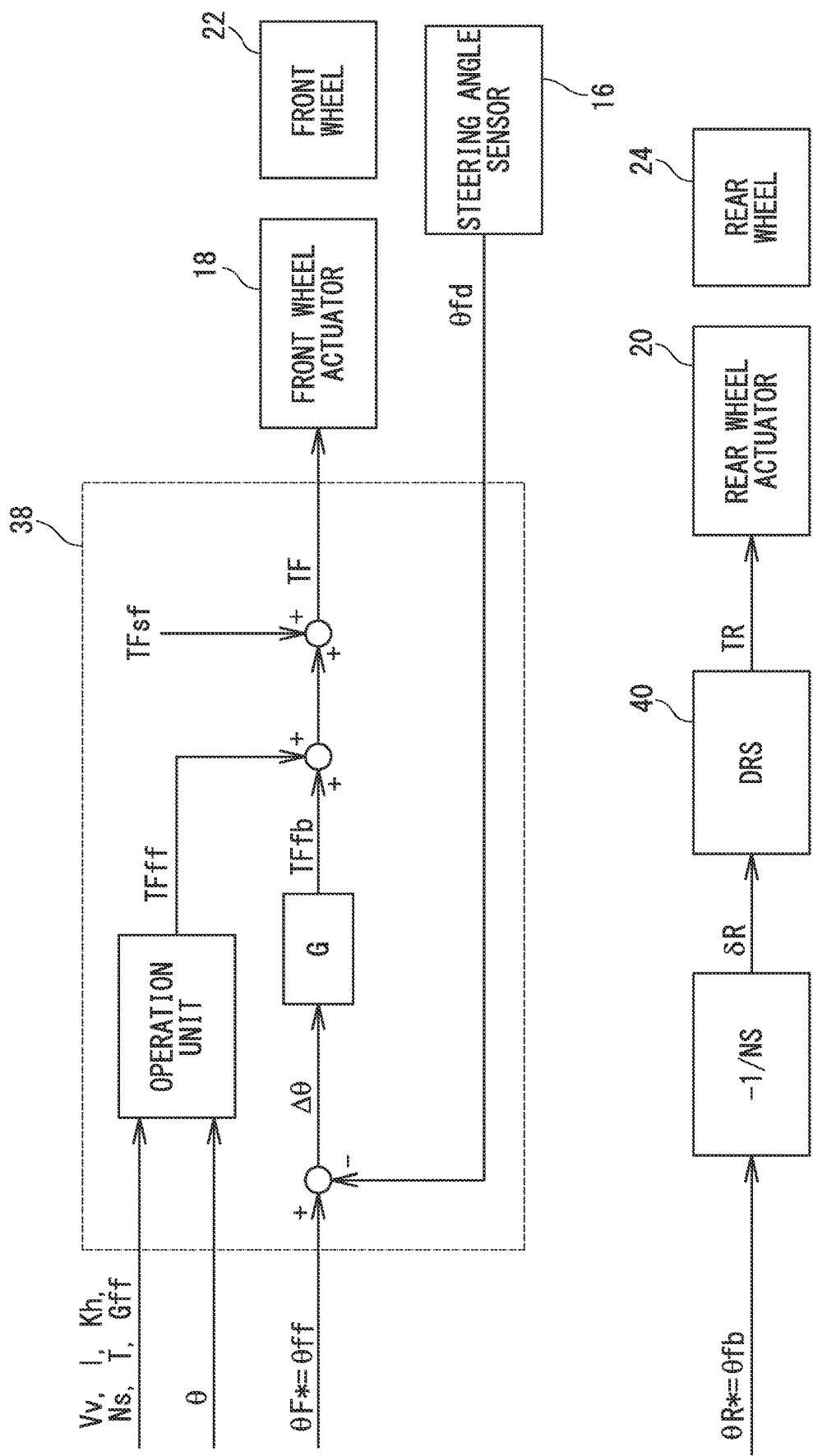
FIG. 4 is a control block diagram showing a flow of calculation of a front wheel torque command and a rear wheel torque command.

FIG. 4 is a control block diagram showing a flow of calculation of the front wheel torque command TF and the rear wheel torque command TR. As shown in FIG. 4, the front wheel torque command TF is a value obtained by adding the front wheel feedback torque TFfb (hereinafter referred to as "front wheel FB torque TFfb"), the front wheel feedforward torque TFff (hereinafter referred to as "front wheel FF torque TFff"), and the front wheel steering torque TFsf.

The front wheel FB torque TFfb is a steering torque for setting the front wheel 22 to the front wheel target steering angle θF*. In the example of FIG. 4, the front wheel target steering angle θF* is the FF steering angle θff. The controller 26 calculates a steering angle difference Δθ, which is a subtraction value obtained by subtracting the front wheel detected steering angle θFd from the FF steering angle θff. Further, the controller 26 calculates the front wheel FB torque TFfb by multiplying the steering angle difference Δθ by a predetermined gain G. Here, the front wheel FB torque TFfb is calculated by proportional calculation. However, the front wheel FB torque TFfb may be calculated by a proportional integral operation or a proportional integral differential operation.

The front wheel FF torque TFff is a steering torque for compensating for a self-aligning torque generated when the front wheel 22 and the rear wheel 24 are steered. The front wheel FF torque TFff is calculated by the following equation (1). In the equation (1), Kh is a stability factor, l is a wheel base, Gff is a vehicle speed gain, and T is a torque conversion coefficient.

[Formula 1]

$$TFff = \frac{Vv^2 \times \theta \times T \times Gff}{(1 + Kh \times Vv^2) \times Ns \times l} \quad (1)$$

The front wheel steering torque TFsf is calculated according to the driver torque and the steering angle, and is an assist torque for assisting the driver. The driver torque is torque applied as a steering input by the driver. Since the front wheel steering torque TFsf can be calculated by a conventional technique, a detailed description thereof is omitted here.

The controller 26 adds the front wheel FB torque TFfb, the front wheel FF torque TFff, and the front wheel steering torque TFsf, and outputs a front wheel torque command TF. The front wheel actuator 18 turns the front wheel in response to the front wheel torque command TF.

The rear wheel torque command TR is calculated based on the rear wheel target steering angle θR*. In this example, the rear wheel target steering angle θR* is the FB steering angle θfb. Here, the FB steering angle θfb is an indication angle with respect to the front wheel 22. Since the rear wheel 24 is controlled in the opposite phase to the front wheel 22, the rear wheel break angle 8R for realizing the FB steering angle θfb is a value obtained by multiplying the FB steering angle θfb by (−1/NS). The DRS 40 multiplies the rear wheel break angle SR by a predetermined coefficient to calculate a rear wheel torque command TR. The rear wheel actuator 20 steers the rear wheel 24 in accordance with the rear wheel torque command TR.

As apparent from the above description, the controller 26 performs feedback control so that the front wheel 22 becomes the FF steering angle θff. The self-aligning torque is also compensated by the front wheel 22. The controller 26 compensates for the difference between the target path and the actual path 52 by steering the rear wheel 24. As a result, even during the automatic driving or the execution of the advanced driving support, the occupant can feel the same feeling as when the vehicle is manually steered. As a result, the comfort of the occupant is improved. Since the difference between the paths is compensated by steering of the rear wheel 24, the vehicle runs along the target path.

Incidentally, when the vehicle runs on a curve, if the correction of the path difference (hereinafter referred to as "corrected steering") is performed only by the steering of the rear wheel 24, the occupant may feel uncomfortable. Therefore, depending on the vehicle type and the traveling condition, a part of the FB steering angle θfb for the corrected steering may be placed on the front wheel 22.

Figure 5:
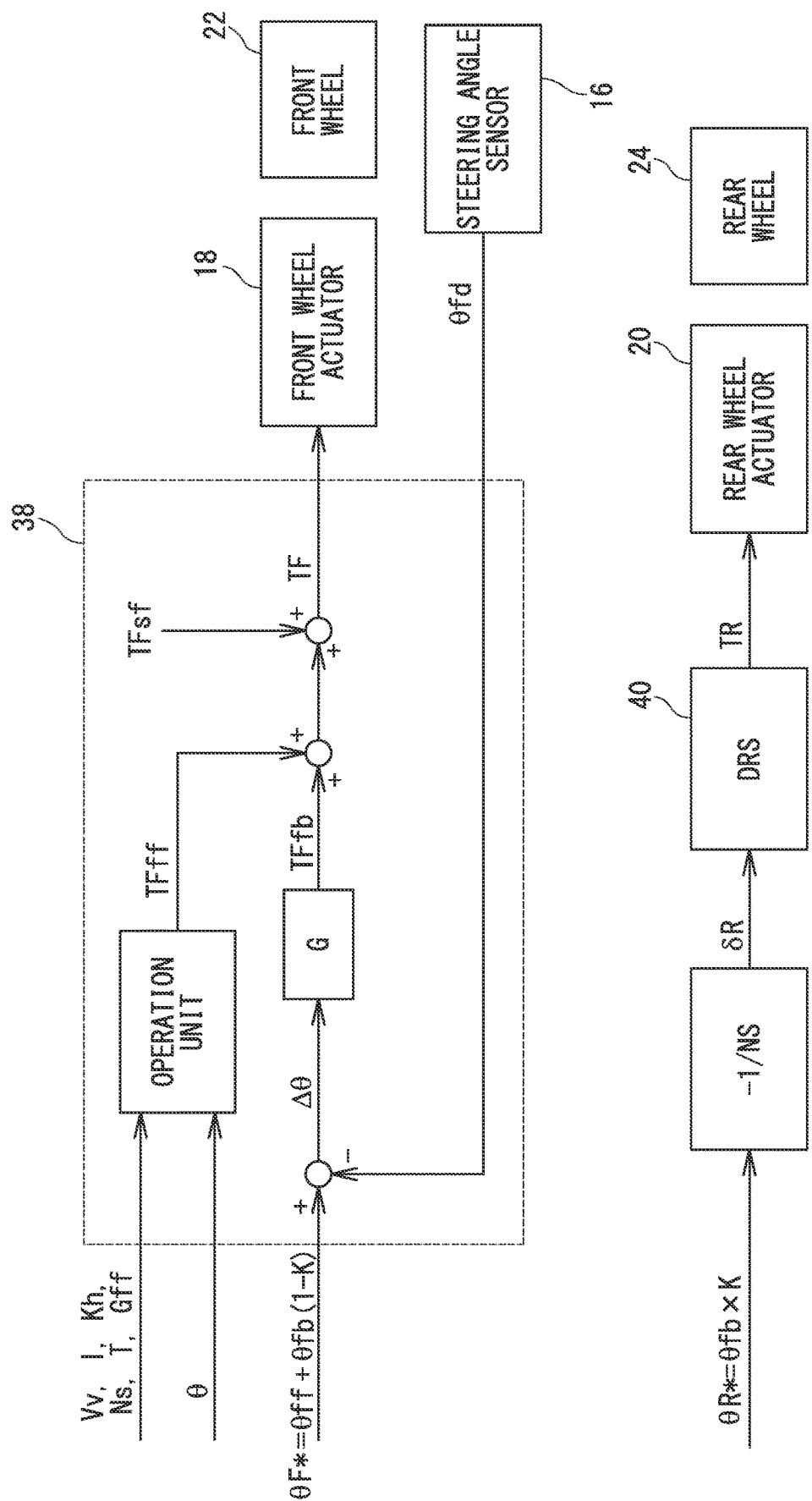
FIG. 5 is a control block diagram showing another example of the flow of calculation of the front wheel torque command and the rear wheel torque command.

FIG. 5 is a control block diagram in this case. As shown in FIG. 5, in this case, the rear wheel target steering angle θR* is a value obtained by multiplying the FB steering angle θfb by a predetermined distribution coefficient K. That is, θR=θfb×K. The distribution coefficient K satisfies 0<K<1. The front wheel target steering angle θF* is a value obtained by adding a value obtained by multiplying the FB steering angle θfb by (1−K) and the FF steering angle θff. That is, $\theta F^* = \theta ff + \theta fb(1-K)$. The example of FIG. 5 differs from the example of FIG. 4 in the values of the front wheel target steering angle $\theta F^*$ and the rear wheel target steering angle $\theta R^*$, but the flow of other calculations is the same as the example of FIG. 4.

By distributing a part of the FB steering angle $\theta fb$ to the front wheel 22 in this manner, the uncomfortable feeling of the occupant may be further reduced. The distribution coefficient K may be an invariant constant or a variable. For example, the distribution coefficient K may be a variable value that decreases as at least one of the lateral acceleration, the vehicle speed Vv, and the curvature of the target path increases. The reason for this is as follows. Normally, when steering manually, when the driver feels a lateral acceleration, the driver operates the steering wheel to turn the front wheel in order to cancel the influence of the lateral acceleration. Also in automatic steering, it is required to give the driver a steering feeling similar to that of the manual steering. Therefore, during execution of the automatic operation, when the lateral acceleration is large, the distribution coefficient K is reduced, and a part of the corrected steering is placed on the front wheel 22. Thus, the feeling of discomfort of the occupant can be reduced. The greater the vehicle speed Vv and the curvature of the target path, the greater the lateral acceleration. Therefore, the distribution coefficient K may be changed according to the vehicle speed Vv and the curvature.

Further, as another form, not only the FB steering angle $\theta fb$ but also the FF steering angle $\theta ff$ may be distributed to the front wheel 22 and the rear wheel 24. For example, the front wheel target steering angle $\theta F^*$ may be $\theta ff(1-P) + \theta fb(1-K)$. Further, the rear wheel target steering angle $\theta R^*$ may be $\theta ff \times P + \theta fb \times K$. Note that P is a coefficient that satisfies $0 < P < 1$, and is independent of the distribution coefficient K.

Further, depending on the vehicle, the FF steering angle $\theta ff$ and the FB steering angle $\theta fb$ may not be calculated individually. In other words, the total steering angle $\theta$ may be directly calculated from the detection values of the environment sensor 12 and the vehicle sensor 14 for the purpose of reducing the calculation amount. In this case, the total steering angle $\theta$ may be distributed to the front wheel 22 and the rear wheel 24 at a predetermined ratio. That is, the front wheel target steering angle $\theta F^*$ may be set to $\theta(1-K)$, and the rear wheel target steering angle $\theta R^*$ may be set to $\theta \times K$.

With such a configuration, even when the FF steering angle $\theta ff$ and the FB steering angle $\theta fb$ cannot be calculated individually, steering can be appropriately performed. However, in this case, the distribution ratio of the FF steering angle $\theta ff$ and the distribution ratio of the FB steering angle $\theta fb$ become the same. In this case, when the distribution coefficient K is set to a constant value, there is a possibility that the vehicle body slip angle at the time of the curve traveling greatly changes from the vehicle body slip angle at the time of the manual steering. When the vehicle body slip angle greatly changes from the vehicle body slip angle at the time of manual steering, the occupant feels uncomfortable. In order to reduce such an uncomfortable feeling, the distribution coefficient K may be a variable value that varies according to at least one of the lateral acceleration, the vehicle speed Vv, and the curvature of the target path. That is, the distribution coefficient K may be decreased as at least one of the lateral acceleration, the vehicle speed Vv, and the curvature of the target path increases. Of course, the distribution coefficient K may be a fixed value.

Any of the configurations described above is an example. As long as the steering control apparatus 10 has the configuration described in claim 1, other configurations may be appropriately changed. For example, in the above description, the front wheel torque command TF includes the front wheel FB torque TFfb, the front wheel FF torque TFff, and the front wheel steering torque TFsf. However, if the front wheel torque command TF includes at least the front wheel FF torque TFff for achieving the front wheel target steering angle $\theta F^*$, at least one of the front wheel FF torque TFff and the front wheel steering torque TFsf may be omitted. The front wheel torque command TF may further include another compensation torque. The rear wheel torque command TR may also include another compensation torque.

REFERENCE SIGNS LIST 10 steering control apparatus, 12 environment sensor, 14 vehicle sensor, 16 steering angle sensor, 18 front wheel actuator, 20 rear wheel actuator, 22 front wheel, 24 rear wheel, 26 controller, 28 processor, 30 memory, 32 target yaw rate calculation unit, 34 FF steering angle calculation unit, 36 FB steering angle calculation unit, 38 electric power steering ECU, 40 DRS, 50 lane, 52 actual path, 54 front wheel path, 56 rear wheel path, FB front wheel, FF front wheel, TF front wheel torque command, TFfb front wheel feedback torque, TFff front wheel feedforward torque, TFsf front wheel steering torque, TR rear wheel torque command, $\Delta\theta$ steering angle difference, $\delta R$ rear wheel break angle, $\theta$ total steering angle, $\theta F^*$ front wheel target steering angle, $\theta Fd$ front wheel detected steering angle, $\theta R^*$ rear wheel target steering angle, $\theta fb$ FB steering angle, $\theta ff$ FF steering angle, Vv vehicle speed, YR target yaw rate.

The invention claimed is:

1. A steering control apparatus comprising:
    an environment sensor for detecting a condition around a vehicle; and
    a controller for controlling turning of a front wheel and turning of a rear wheel,
    wherein the controller is configured to:
        calculate a total steering angle which is a steering angle required for causing the vehicle to travel along a target path, based on at least a detection result of the environment sensor;
        turn the front wheel based on a front wheel target steering angle; and
        turn the rear wheel based on a rear wheel target steering angle that is a subtraction value obtained by subtracting the front wheel target steering angle from the total steering angle.

2. The steering control apparatus according to claim 1, wherein
    the controller is configured to:
        calculate the target path and a current actual path based on the detection result of the environment sensor;
        calculate an FF steering angle based on the target path;
        calculate an FB steering angle based on a difference between the target path and the actual path; and
        calculate a sum of the FF steering angle and the FB steering angle as the total steering angle,
    the front wheel target steering angle is the FF steering angle, and the rear wheel target steering angle is the FB steering angle.

3. The steering control apparatus according to claim 1, wherein
    the controller is configured to:
        calculate the target path and a current actual path based on the detection result of the environment sensor;
        calculate an FF steering angle based on the target path;

calculate an FB steering angle based on a difference between the target path and the actual path; and calculate a sum of the FF steering angle and the FB steering angle as the total steering angle, the rear wheel target steering angle is a value obtained by multiplying the FB steering angle by a distribution coefficient of greater than 0 and less than 1, a value obtained by multiplying the total steering angle by the distribution coefficient, or a value obtained by adding a portion of the FF steering angle to a value obtained by multiplying the FB steering angle by the distribution coefficient, and the front wheel target steering angle is a subtraction value obtained by subtracting the rear wheel target steering angle from the total steering angle.

4. The steering control apparatus according to claim 3, wherein the distribution coefficient is a variable value that decreases as at least one of a lateral acceleration, a vehicle speed, and a curvature of the target path increases.

5. The steering control apparatus according to claim 1, wherein the controller is configured to:

calculate a front wheel FB torque based on a difference between the front wheel target steering angle and a detected steering angle of the front wheel;

calculate a front wheel FF torque for compensating for a self-aligning torque of the front wheel and a self-aligning torque of the rear wheel based on the total steering angle; and calculate a front wheel torque command for turning the front wheel based on a sum of the front wheel FF torque and the front wheel FB torque.

* * * * *